United States Patent [19]

Reijnaerts

[11] Patent Number: 5,424,616
[45] Date of Patent: Jun. 13, 1995

[54] MODULATGED HIGH FREQUENCY DISCHARGE LAMP OPERATING CIRCUIT WITH IR SUPPRESSION

[75] Inventor: Jozef H. Reijnaerts, Heerlen, Netherlands

[73] Assignee: U.S. Philips Corporation, New York, N.Y.

[21] Appl. No.: 310,828

[22] Filed: Sep. 22, 1994

[30] Foreign Application Priority Data

Jul. 20, 1992 [EP] European Pat. Off. ......... 92202206

[51] Int. Cl.$^6$ ............................................. H05B 41/16
[52] U.S. Cl. ................................ 315/248; 315/224; 315/226; 315/307; 315/DIG. 2; 315/DIG. 4; 315/DIG. 5
[58] Field of Search .......... 315/248, 226, 224, 209 R, 315/289, 307, DIG. 2, DIG. 4, DIG. 5, DIG. 7

[56] References Cited

U.S. PATENT DOCUMENTS 4,766,350 8/1988 Husgen et al. ............ 315/DIG. 7 X
5,243,261 9/1993 Bergervoet et al. ............ 315/248

Primary Examiner—Robert J. Pascal
Assistant Examiner—Haissa Philogene
Attorney, Agent, or Firm—Bernard Franzblau

[57] ABSTRACT

A circuit arrangement for operating a discharge lamp by means of a high-frequency current includes a switching device for generating the high-frequency current from a supply voltage, a modulator for the substantially square-wave modulation of the amplitude of the high-frequency current at a modulation frequency f, and an apparatus (M) for limiting the interference with infrared systems caused by the discharge lamp. The limiting apparatus (M) comprise a circuit N for providing a gradual increase in the rate at which the amplitude of the high-frequency current decreases at the end of a square wave of the square-wave modulation. This provides a considerable reduction in the interference with infrared systems caused by a lamp operated by the circuit arrangement.

19 Claims, 3 Drawing Sheets

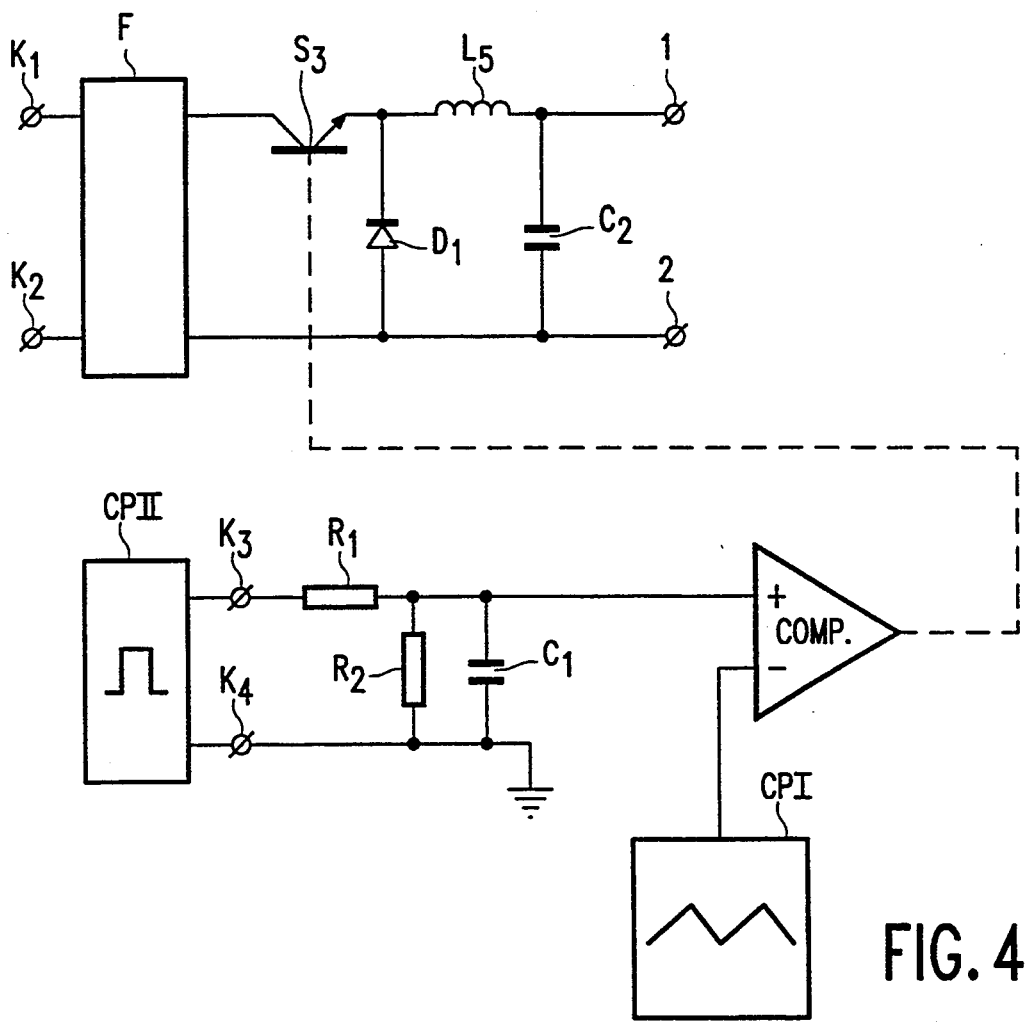
FIG. 4
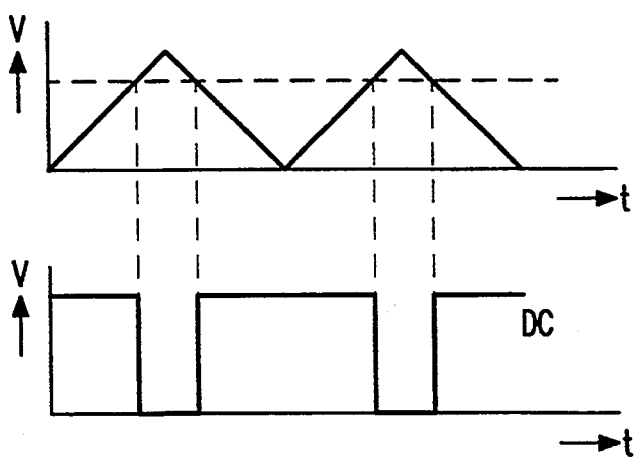
FIG. 5a
FIG. 5b

MODULATGED HIGH FREQUENCY DISCHARGE LAMP OPERATING CIRCUIT WITH IR SUPPRESSION

BACKGROUND OF THE INVENTION

This invention relates to a circuit arrangement for operating a discharge lamp by means of a high-frequency current, comprising switching means for generating the high-frequency current from a supply voltage, a modulator for the substantially square-wave modulation of the amplitude of the high-frequency current with a modulation frequency f, and means M for limiting the interference with infrared systems caused by the discharge lamp.

Such a circuit arrangement is described in European Patent Application, not previously published, and which corresponds to U.S. Pat. No. 5,243,261 (Sep. 7, 1993).

The circuit arrangement is suitable for operating discharge lamps, in particular low-pressure discharge lamps, more particularly electrodeless low-pressure discharge lamps.

During lamp operation by means of the circuit arrangement described therein, a substantially square-wave modulated high-frequency voltage is present across the discharge lamp, to be referred to as the lamp hereinafter. The frequency and phase of the substantially square-wave modulation of the high-frequency voltage across the lamp are the same as the frequency and phase of the substantially square-wave modulation of the high-frequency current. At the start of each square wave of the substantially square-wave modulated high-frequency voltage, the lamp is re-ignited by the high-frequency voltage which then acts as a re-ignition voltage. After this the amplitude of the high-frequency voltage drops to a substantially constant lamp-dependent value owing to the fact that the lamp becomes conducting, and the high-frequency voltage causes the high-frequency current to flow through the lamp during the square wave. In the remaining portion of each cycle of the substantially square-wave modulation of the high-frequency voltage, practically no voltage is present across the lamp and practically no current flows through the lamp. The lamp is dimmed in that a duty cycle $\delta$ of the substantially square-wave modulation of the high-frequency voltage is adjusted. It was found that the luminous efficacy is comparatively high and substantially independent of the luminous flux with this dimming method.

The means M in the circuit arrangement described in the European Patent Application and the corresponding U.S. Pat. No. 5,243,261 comprise means for limiting the amplitude of the re-ignition voltage with which the discharge lamp is re-ignited at the start of each square wave. The circuit arrangement may also be provided with means for limiting the speed with which the amplitude of the high-frequency current drops at the end of each square wave of the square-wave modulation. These measures each produce a considerable reduction in the interference with infrared systems caused by the discharge lamp. A disadvantage of the known circuit arrangement, even if provided with the two measures indicated above, however, is that a lamp operated by means of this circuit arrangement still causes a certain amount of interference with infrared systems.

SUMMARY OF THE INVENTION

The invention has for its object, inter alia, to provide a circuit arrangement with which the degree of interference with infrared systems caused by a lamp operated by the circuit arrangement is reduced.

According to the invention, this object is achieved in that the means M of a circuit arrangement of the kind mentioned in the opening paragraph comprise means N for providing a gradual increase in the speed with which the amplitude of the high-frequency current decreases at the end of a square wave of the square-wave modulation.

During lamp operation utilizing the circuit arrangement described in the European Patent Application no. 92200255.5 not previously published, the speed with which the amplitude of the high-frequency current decreases at the end of each square wave changes abruptly from substantially zero to a comparatively high value. This abrupt change causes a sharp angle in the square-wave form between the substantially constant level corresponding to stationary lamp operation and the trailing edge of the square wave. The substantially square-wave modulation modulates both the luminous flux of the visible light radiated by the discharge lamp and the luminous flux of the infrared light radiated by the discharge lamp. Interference with infrared systems is caused by this substantially square-wave modulation of the infrared flux. The presence of a sharp angle in the square-wave causes a comparatively great intensity in the infrared light radiated by the lamp at comparatively high frequencies in the frequency spectrum of the power of the square-wave modulated infrared flux. Since infrared systems often use such comparatively high frequencies, the interference with infrared systems is caused to a considerable extent by the sharp angle in the square-wave form. The means N effect a rounding of the sharp angle in the square-wave form of both the substantially square-wave modulated high-frequency voltage and the substantially square-wave modulated high-frequency current. This rounding effect causes the intensity of the infrared light radiated by the lamp at comparatively high frequencies to decrease, whereby the interference with infrared systems decreases. It was found that the reduction in interference with infrared systems is greater in proportion as the speed with which the amplitude of the high-frequency current decreases at the end of each square wave rises more slowly.

In a circuit arrangement according to the invention comprising a converter provided with a switching element for generating a DC voltage from a supply voltage, from which DC voltage the high-frequency current is generated during lamp operation, the means N may be advantageously realised in the form of means which gradually increase the speed with which the duty cycle of the switching element decreases at the end of each square wave. This gradual increase in the speed with which the duty cycle of the switching element decreases causes a gradual increase in the speed with which the DC voltage decreases, and thus a corresponding gradual increase in the speed with which the amplitude of the high-frequency current decreases.

To realise a further suppression of interference with infrared systems, it is possible to provide the circuit arrangement with means for limiting the re-ignition voltage at the beginning of each square wave and/or means for limiting the speed with which the amplitude of the voltage across the lamp decreases at the end of each square wave. These two measures are described in the European Patent Application cited above and not previously published. In a circuit arrangement comprising a converter provided with a switching element for generating from a supply voltage a DC voltage from which a high-frequency current is generated during lamp operation, these two measures may be implemented ill a comparatively simple manner in that the circuit arrangement is provided with means for limiting the duty cycle at the beginning of each square wave and/or means for limiting the speed with which the duty cycle decreases at the end of each square wave.

BRIEF DESCRIPTION OF THE DRAWING

Embodiments of the invention will be described in more detail with reference to the accompanying drawing.

In the drawing.

FIG. 4 shows part of the embodiment of FIG. 2 in more detail, and

FIG. 5(a and b) shows the shape of voltages present at different terminals in the circuitry shown in FIG. 4.

DESCRIPTION OF THE PREFERRED EMBODIMENTS

Figure 1:
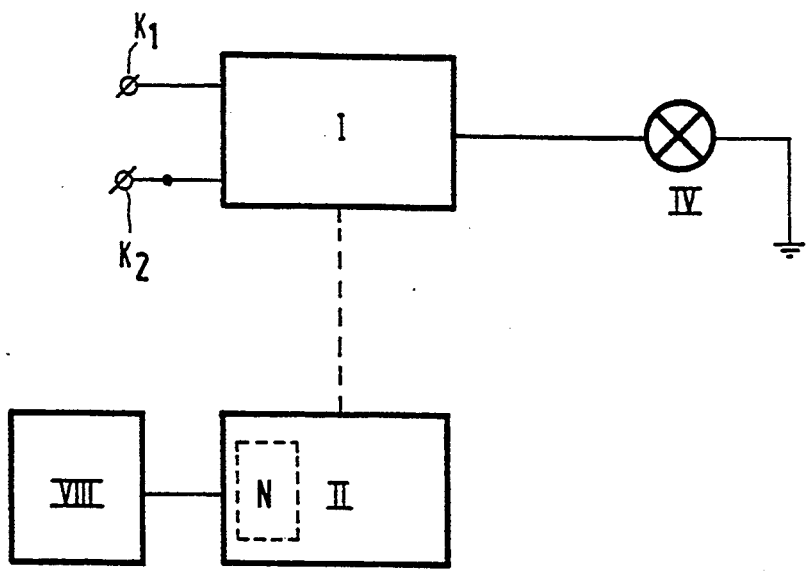
FIG. 1 is a block diagram of an embodiment of a circuit arrangement according to the invention.

In FIG. 1, K1 and K2 are input terminals suitable for connection to a supply voltage source. Switching means I are coupled to the input terminals for generating a high-frequency current from a supply voltage supplied by the supply voltage source. A modulator II is provided for the substantially square-wave modulation of the amplitude of the high-frequency current at a modulation frequency f. Modulator II is also provided with means N for gradually increasing the speed with which the amplitude of the high-frequency current decreases at the end of a square wave of the square-wave modulation. Modulator II is coupled to switching means I. An output of switching means I is coupled to a lamp IV. Modulator II is also coupled to switching means VIII for adjusting the duty cycle δ of the substantially square-wave modulated high-frequency current.

The operation of the circuit arrangement shown in FIG. 1 is as follows.

When the input terminals K1 and K2 are connected to a supply voltage source, the switching means I generate a high-frequency current which is modulated into a substantially square-wave form by the modulator II with a modulation frequency f. The means N achieve that the speed with which the amplitude of the high-frequency current decreases increases gradually at the end of each square wave. Thus the presence of a sharp angle in the square-wave form is avoided, and the interference with infrared systems caused by the lamp IV is comparatively small as a result.

The luminous flux of the lamp is adjustable through adjustment of the duty cycle δ of the substantially square-wave modulated high-frequency current by means of the switching means VIII.

Figure 2:
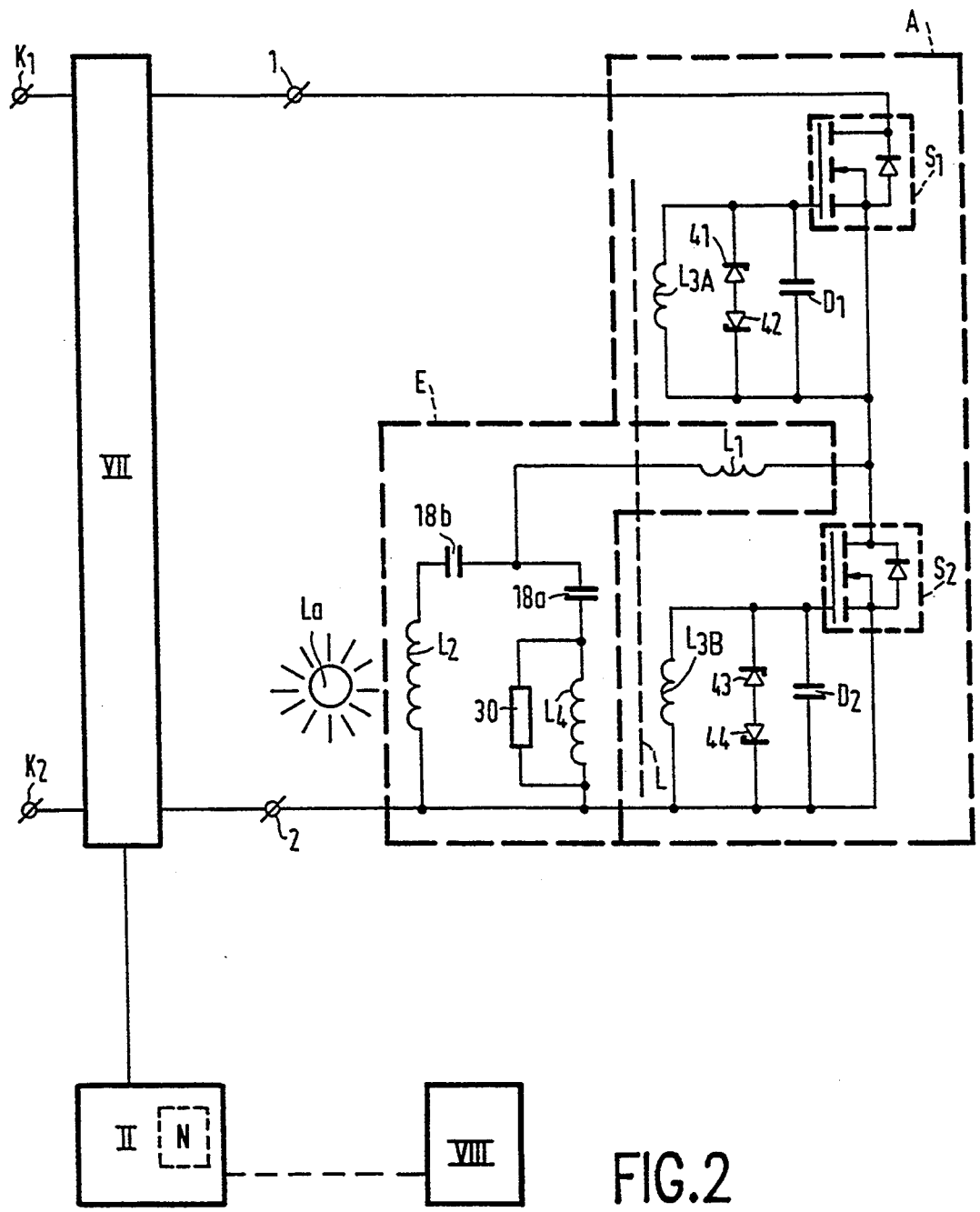
FIG. 2 shows the embodiment of FIG. 1 in more detail.

In the circuit arrangement shown in FIG. 2, circuit branches A and E together with input terminals 1 and 2 form an incomplete half bridge. K1 and K2 are input terminals suitable for connection to a supply voltage source and VII is a converter provided with a switching element for generating a DC voltage from a supply voltage. Together with the converter VII and the input terminals K1 and K2, the incomplete half bridge constitutes switching means for generating a high-frequency current from a supply voltage. La is an electrodeless lamp operated by these switching means. Modulator II is coupled to converter VII.

The incomplete half bridge is constructed as follows.

Branch A is formed by switching elements S1 and S2, secondary windings L3A and L3B of transformer L, zener diodes 41, 42, 43 and 44, and capacitors D1 and D2. Load branch E comprises coil L1 and the load circuit which is formed by coil L2, primary winding L4 of transformer L, capacitors 18a and 18b, and resistor 30. Switching elements S1 and S2 each comprise a flywheel diode of which an anode is connected to a first main electrode of the relevant switching element and a cathode is connected to a second main electrode of the relevant switching element. Coil L2 is positioned inside a recess of a lamp vessel of an electrodeless lamp La. The second main electrode of the switching element S1 is connected to input terminal 1. An end of the secondary winding L3A is connected to a control electrode of the switching element S1 and a further end of the secondary winding L3A is connected to the first main electrode of the switching element S1. The capacitor D1 shunts the secondary winding L3A. The secondary winding L3A is also shunted by a series arrangement of two zener diodes 41 and 42 whose anodes are interconnected. The first main electrode of the switching element S1 is connected to the second main electrode of the switching element S2. An end of the secondary winding L3B is connected to a control electrode of the switching element S2 and a further end of the secondary winding L3B is connected to the first main electrode of the switching element S2. The capacitor D2 shunts the secondary winding L3B. The secondary winding L3B is also shunted by a series arrangement of two zener diodes 43 and 44 whose anodes are interconnected. The first main electrode of switching element S2 is connected to input terminal 2. A side of coil L1 is connected to a common junction point of switching elements S1 and S2. A further end of coil L1 is connected to a side of capacitor 18a and a side of capacitor 18b. A further side of capacitor 18b is connected to an end of coil L2. A further end of coil L2 is connected to input terminal 2. A further end of capacitor 18a is connected to primary winding L4. A further end of primary winding L4 is connected to input terminal 2. Resistor 30 shunts primary winding L4.

The operation of the circuit arrangement shown in FIG. 2 is as follows.

When the input terminals K1 and K2 are connected to the poles of a supply voltage source, a substantially square-wave voltage Vin with a duty cycle δ and a frequency f is present between the input terminals 1 and 2. The voltage Vin is substantially equal to zero during a portion of the cycle belonging to the frequency f. During this portion of each cycle the voltage across the lamp La is also substantially equal to zero. For the remaining portion of each cycle of Vin, the potential of input terminal 1 is higher than that of input terminal 2, and the switching elements S1 and S2 of the incomplete half bridge are rendered conducting and non-conducting at a high frequency $v$. As a result of this, a high-frequency voltage with a frequency $v$ is present across the lamp La. Thus, a substantially square-wave modulated high-frequency voltage is present across the lamp La, the phase and the frequency of the substantially square-wave modulation corresponding to those of the substantially square-wave voltage Vin. The high-frequency voltage across the lamp serves as a re-ignition voltage at the beginning of each square wave of the substantially square-wave modulation. After re-ignition, a high-frequency current flows through the lamp for the remaining portion of each square wave. Means N gradually increase the speed with which the amplitude of Vin decreases at the end of each square wave from substantially the value zero during a time interval which is a substantial portion of a cycle of the voltage Vin. As a result, the speed with which the amplitude of the high-frequency voltage across the lamp decreases, and thus also the speed with which the amplitude of the high-frequency current through the lamp decreases, increase gradually from substantially the value zero over a time interval which is a substantial portion of a cycle of the substantially square-wave modulation. This gradual increase in the speed with which the high-frequency current through the lamp decreases at the end of each square wave of the substantially square-wave modulation leads to a suppression of the interference with infrared systems.

When the supply voltage is an AC voltage, the converter VII may be constructed, for example, from a diode bridge and a combination of one or several DC—DC converters of types such as upconverters, downconverters, or flyback converters. It is possible to give Vin a substantially square-wave form with frequency f and to control the amplitude of Vin as a function of time by varying the duty cycle of the switching element(s) present in the DC—DC converter(s) periodically with the frequency f.

Figures 3A, 3B:
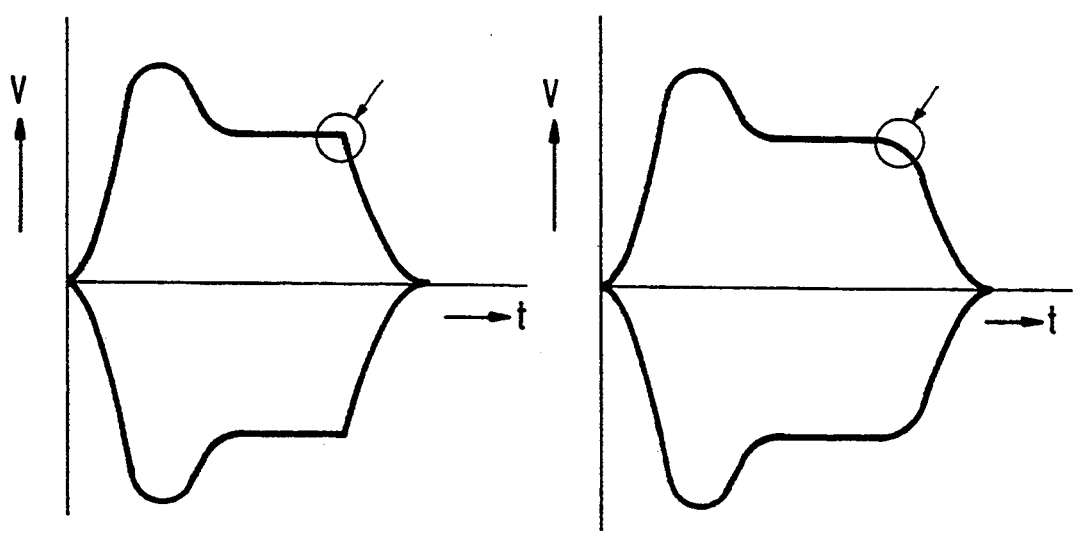
FIG. 3(A and B) shows a waveform of a square wave of a square-wave modulated high-frequency current generated by means of the embodiment of FIG. 2, and a waveform of a square wave of a square-wave modulated high-frequency current generated by means of a circuit arrangement as described in the European Patent Application no. 92200255.5 not previously published and not provided with means for gradually increasing the speed with which the amplitude of the high-frequency current decreases at the end of each square wave.

FIG. 3a shows the waveform of a square wave of the square-wave modulated voltage across a lamp operated by a circuit arrangement of the kind mentioned in the opening paragraph and not provided with the means N. It is apparent that the speed with which the amplitude of the voltage decreases at the end of the square wave changes abruptly from substantially zero to a comparatively high value. As a result, the waveform shows a sharp angle between the trailing edge and the substantially constant level corresponding to stationary lamp operation. FIG. 3b shows the waveform of a square wave of the square-wave modulated voltage across a lamp operated on a circuit provided with means N. The means N achieve a gradual increase of the speed with which the amplitude of the voltage across the lamp decreases, so that the square-wave form does not show a sharp angle.

In FIG. 4 terminals K1 and K2 correspond to terminals K1 and K2 in FIG. 2. Terminals 1 and 2 correspond to terminals 1 and 2 in FIG. 2. Converter VII comprises a rectifier bridge RB, a DC—DC-converter and a capacitor C2. The DC—DC-converter comprises an inductive element L5, a high frequency operated switching element S3 and a diode D1. Switching means VIII in this embodiment are formed by circuit part CPII. Circuit part CPII is a signal generator for generating a substantially square wave shaped signal with a frequency f and a duty cycle δ. Output terminals of circuit part CPII are connected to terminals K3 and K4 respectively. Terminals K3 and K4 are connected by means of a series arrangement of resistor R1 and resistor R2. Resistor R2 is shunted by capacitor C1. A common junction point of resistor R1 and resistor R2 is connected to a first input terminal of comparator COMP. A second input terminal of comparator COMP is connected to an output terminal of circuit part CPI. Circuit part CPI is a signal generator for generating a triangularly shaped signal. An output terminal of comparator COMP is connected to a control electrode of switching element S3. During operation a substantially square wave signal with a frequency f is present between terminals K3 and K4. When the substantially square wave signal present between K3 and K4 is high there is a constant voltage present over capacitor C1. The triangularly shaped voltage generated by circuit part CPI has an amplitude higher than the amplitude of the voltage present over capacitor C1. Both signals are fed to the comparator COMP generating a substantially square wave signal having a duty cycle proportional to the voltage over capacitor C1 and a frequency equal to that of the triangularly shaped voltage (see also FIG. 2). This signal is used to drive the switching element S3. When the signal present between terminals K3 and K4 turns from high to low, capacitor C1 discharges via R1 and R2. This discharge is taking place gradually. As a result the duty cycle of the signal used to drive the switching element S3 and therefore the voltage over capacitor C2 change also gradually. This in turn causes a gradual increase in the speed with which the amplitude of the high frequency current generated in the load decreases at the end of a square wave of the square-wave modulation.

In addition it is mentioned that the impedance of the load (formed by branch A, load branch E and the discharge lamp operated on the circuit arrangement) and the capacitance of capacitor C2 determine in this embodiment the steepness with which each square wave of the substantially square wave modulation decreases at the end. The steepness at the beginning of each square wave is limited, since the capacitor C1 will charge via resistor R1 and therefor will charge only gradually when the signal between terminals K3 and K4 turns from low to high.

In FIG. 5a the solid curve represents the shape of the triangularly shaped signal generated by circuit part CPI. The voltage over capacitor C1 is shown by the dotted line. In FIG. 5b the output signal of comparator COMP is shown. From FIG. 5 it can be seen that the duty cycle of this latter signal decreases when the voltage over capacitor C1 decreases.

With a practical embodiment of a circuit arrangement as shown in FIG. 2, the power of the infrared light was measured for an electrodeless low-pressure mercury discharge lamp whose (visible) luminous flux was 3500 lumens at a frequency of 36 kHz and a bandwidth of 4 kHz, during normal operation of the circuit arrangement while the means N were active and while the means N were rendered inactive. The frequency of the square-wave modulation was 500 Hz. Provisions were made in the circuit arrangement for limiting the re-ignition voltage, and the speed with which the amplitude of the high-frequency voltage across the low-pressure mercury discharge lamp decreases at the end of each square wave was limited to 1,1 V/μs. In the case in which the means N were inactive, the speed with which the amplitude of the high-frequency voltage decreased changed from substantially zero to approximately 1,1 V/μs at the end of each square wave in less than 1 μs. When the means N were switched on, the speed with which the amplitude of the high-frequency voltage decreases at the end of each square wave increased from substantially zero to approximately 1,1 V/μs over a time interval of approximately 50 μs. In either case the speed of the decrease in amplitude of the high-frequency voltage across the low-pressure mercury discharge lamp remained substantially constant after the value of 1,1 V/μs had been reached. It was found that the power of the infrared light radiated by the discharge lamp measured at a frequency of 36 kHz and a bandwidth of 4 kHz was lower by approximately a factor 3 with active means N compared with the situation with inactive means N. Since many infrared systems operate at a frequency of the order of 10 kHz, this strong decrease in the power of the infrared light in fact shows that the means N in this practical embodiment of a circuit arrangement according to the invention lead to a considerable reduction of the interference caused by the discharge lamp.

I claim:

1. A circuit arrangement for operating a discharge lamp by means of a high-frequency current, comprising:
   switching means for generating the high-frequency current from a supply voltage,
   a modulator for the substantially square-wave modulation of the amplitude of the high-frequency current at a modulation frequency f, and
   means for limiting interference with infrared systems caused by the discharge lamp,
   wherein the interference limiting means comprise means N for providing a gradual increase in the speed with which the amplitude of the high-frequency current decreases at the end of a square wave of the square-wave modulation.

2. A circuit arrangement as claimed in claim 1, comprising a converter provided with a switching element for generating a DC voltage from the supply voltage, from which DC voltage the high-frequency current is generated during lamp operation, wherein the means N include means for gradually increasing the speed with which the duty cycle of the switching element decreases at the end of each square wave.

3. A circuit arrangement as claimed in claim 1 further comprising means for limiting the amplitude of a re-ignition voltage at the beginning of each square wave.

4. A circuit arrangement as claimed in claim 3, comprising a converter provided with a switching element for generating a DC voltage from the supply voltage, from which DC voltage the high-frequency current is generated during lamp operation, wherein the means for limiting the amplitude of the re-ignition voltage at the beginning of each square wave include means for limiting the duty cycle of the switching element at the beginning of each square wave.

5. A circuit arrangement as claimed in claim 1 wherein the circuit arrangement also includes means for limiting the speed with which the amplitude of a voltage across the lamp decreases at the end of each square wave.

6. A circuit arrangement as claimed in claim 5, comprising a converter provided with a switching element for generating a DC voltage from the supply voltage, from which DC voltage the high-frequency current is generated during lamp operation, wherein the means for limiting the speed with which the amplitude of the voltage across the lamp decreases at the end of each square wave include means for limiting the speed with which the duty cycle of the switching element of the converter decreases at the end of each square wave.

7. A circuit arrangement as claimed in claim 2, further comprising, means for limiting the amplitude of a re-ignition voltage at the beginning of each square wave.

8. A circuit arrangement as claimed in claim 2 wherein the circuit arrangement also includes means for limiting the speed with which the amplitude of a voltage across the lamp decreases at the end of each square wave.

9. A circuit arrangement as claimed in claim 3 wherein the circuit arrangement also includes means for limiting the speed with which the amplitude of a voltage across the lamp decreases at the end of each square wave.

10. A circuit arrangement as claimed in claim 8, wherein the means for limiting the speed with which the amplitude of the voltage across the lamp decreases at the end of each square wave include means for limiting the speed with which the duty cycle of the switching element of the converter decreases at the end of each square wave.

11. A high frequency operating circuit for a discharge lamp comprising:
    a pair of input terminals for connection to a source of supply voltage for the circuit,
    an output circuit for energization of a discharge lamp,
    a high frequency current generator coupled to said pair of input terminals and to said output circuit,
    a modulator circuit coupled to said high frequency current generator for substantially square wave modulating a high frequency current generated by the high frequency current generator and at a modulation frequency f, and
    circuit means for providing a gradual increase in the rate at which the amplitude of the high frequency current decreases at the end of a square wave of the square wave modulation thereby to reduce any infrared radiation produced by a discharge lamp.

12. A high frequency operating circuit as claimed in claim 11 wherein said high frequency current generator comprises a converter including at least one switching transistor, and
    said circuit means is coupled to said converter so as to gradually increase the rate at which the duty cycle of the switching transistor decreases at the end of each square wave.

13. A high frequency operating circuit as claimed in claim 12 wherein said circuit means further comprises means for limiting the duty cycle of the switching transistor at the beginning of each square wave thereby to limit the amplitude of a lamp re-ignition voltage derived at the beginning of each square wave.

14. A high frequency operating circuit as claimed in claim 13 wherein said circuit means also includes means for limiting the rate at which the amplitude of lamp voltage decreases at the end of each square wave.

15. A high frequency operating circuit as claimed in claim 14 further comprising means coupled to the modulator circuit for adjusting the duty cycle of the modulated high frequency lamp current so as to adjusts the light level produced by the lamp.

16. A high frequency operating circuit as claimed in claim 11 wherein said circuit means also includes means for limiting the rate at which the amplitude of lamp voltage decreases at the end of each square wave.

17. A high frequency operating circuit as claimed in claim 11 further comprising means coupled to the modulator circuit for adjusting the duty cycle of the modulated high frequency lamp current so as to adjust the light level produced by the lamp.

18. A high frequency operating circuit as claimed in claim 11 further comprising a DC converter coupled between said pair of input terminals and an input of said high frequency current generator to supply a DC voltage to said current generator input, said converter including at least one switching element whose duty cycle is controlled by said circuit means so as to increase the rate at which the amplitude of said DC voltage decreases at the end of each square wave during a time interval which is a substantial portion of a cycle of the modulation frequency f.

19. A high frequency operating circuit as claimed in claim 11 wherein the discharge lamp comprises an electrodeless low-pressure mercury discharge lamp and said output circuit includes an inductor arranged close to the discharge lamp and supplied with said modulated high frequency current.

* * * * *